(12) United States Patent
Townsend et al.

(10) Patent No.: US 6,516,829 B1
(45) Date of Patent: Feb. 11, 2003

(54) VENT VALVE

(75) Inventors: David Townsend, Wakefield (GB); Liam Rowley, West Yorkshire (GB)

(73) Assignee: WABCO Automotive UK Limited (GB)

(*) Notice: Subject to any disclaimer, the term of this patent is extended or adjusted under 35 U.S.C. 154(b) by 0 days.

(21) Appl. No.: 09/830,481

(22) PCT Filed: Oct. 8, 1999

(86) PCT No.: PCT/GB99/03351

§ 371 (c)(1),
(2), (4) Date: Apr. 27, 2001

(87) PCT Pub. No.: WO00/26567

PCT Pub. Date: May 11, 2000

(30) Foreign Application Priority Data

Oct. 29, 1998 (GB) .................................... 9823614

(51) Int. Cl.[7] .......................... F16K 24/04; F16K 15/14
(52) U.S. Cl. .................. 137/517; 137/512.15; 137/854
(58) Field of Search ........................... 137/512.15, 854, 137/517

(56) References Cited

U.S. PATENT DOCUMENTS

| 2,948,296 | A | | 8/1960 | Thornburn |  |
|---|---|---|---|---|---|
| 3,297,048 | A | * | 1/1967 | Imhof | 137/517 |
| 3,454,182 | A | * | 7/1969 | Morton | 137/517 |
| 3,605,132 | A | * | 9/1971 | Lineback | 137/854 |
| 4,054,152 | A | | 10/1977 | Ito et al. | |
| 4,506,507 | A | * | 3/1985 | Wimbush | 137/854 |
| 4,918,768 | A | * | 4/1990 | DeSousa et al. | 137/854 |
| 5,419,366 | A | * | 5/1995 | Johnston | 137/854 |
| 5,507,318 | A | | 4/1996 | Israelson | |

FOREIGN PATENT DOCUMENTS

GB          2 288 452 A          10/1995

* cited by examiner

*Primary Examiner*—Michael Powell Buiz
*Assistant Examiner*—R. Krishnamurthy
(74) *Attorney, Agent, or Firm*—Nixon Peabody LLP; Jeffrey L. Costellia

(57) ABSTRACT

A vent valve for an air braking system of a vehicle comprises an elastomeric valve member (11) held in relation to a vent (17) and having a restricted vent passageway. A continuous depending rib (23) is engageable with a valve seat (28) to close the vent passageway as increasing pressure acts on the head (21) of the valve member (11). The valve member (11) permits a fluid chamber to be connected to exhaust until pressure in the chamber reaches a predetermined level.

11 Claims, 1 Drawing Sheet

VENT VALVE

This invention relates to a vent valve for an air braking system of a vehicle.

Vent valves are required in an air braking system in order to drain moisture which may accumulate in the signal or supply lines. Manually operable valves are somewhat difficult to design, and are generally undesirable because they tend to be opened at rather infrequent intervals. Automatic vent valves are therefore preferred, hitherto such automatic valves have included precision engineered components such as pistons, springs and valve seating devices, and are therefore somewhat expensive.

An air braking system of a vehicle also includes a compressor which is brought on-load by a demand signal. When the compressor is off-load, but running, lubrication oil may accumulate on the head of the piston. This oil will enter the air braking system when the compressor is brought on-load, and it has been proposed to vent such oil laden air to exhaust. Again, the vent valve proposed for this purpose is a precision engineered component which is rather expensive.

What is required is an inexpensive and adaptable valve to suit either or both of the aforementioned circumstances.

According to the invention there is provided a vent valve for a fluid pressure circuit, the valve comprising a closed chamber having an inlet port and a vent, the vent defining a valve seat about the inner side thereof and having a resilient valve member engageable with said seat, the valve member comprising a head, a continuous rib depending from said head and adapted for sealing engagement with said seat, and means to hold said valve member adjacent said vent; the rim of said head engaging said chamber about said seat to resiliently support said rib away from said seat, and defining openings whereby said chamber can communicate with said vent; the vent valve thereby defining a fluid passage from said chamber via said openings, seat and vent, and said fluid passage having a restricted flow area such that increasing pressure in said chamber deforms said head towards said vent, thereby sealingly engaging said rib and seat.

Such a valve can be very simply constructed using a unitary moulding of e.g. synthetic rubber. The valve preferably incorporates retaining means to secure the valve member in relation to the vent, these retaining means preferably being provided on the valve member itself. The retaining means may for example be a snap fit projection of the valve member, and in the preferred embodiment comprise a limb removably engageable in the vent itself.

The valve seat and depending rib are preferably circular, the seat being planar and immediately adjacent the vent.

The vent may include a passage having inwardly directed arms defining vent passageways therebetween. The vent may be defined by an annular insert, and such an arrangement permits variation of the area of said vent passageways.

Preferably the depending rib defines with the valve seat a travel stop for the valve member, thereby restricting the stroke of the valve from the rest condition.

The valve is particularly useful in an air braking system of a vehicle, and may be used to vent part of the system automatically. In a preferred embodiment the valve is positioned in the signal line from the governor valve to the compressor, and purges accumulated moisture from this line.

Other features of the invention will be apparent from the following description of a preferred embodiment in which.

Figure 1:
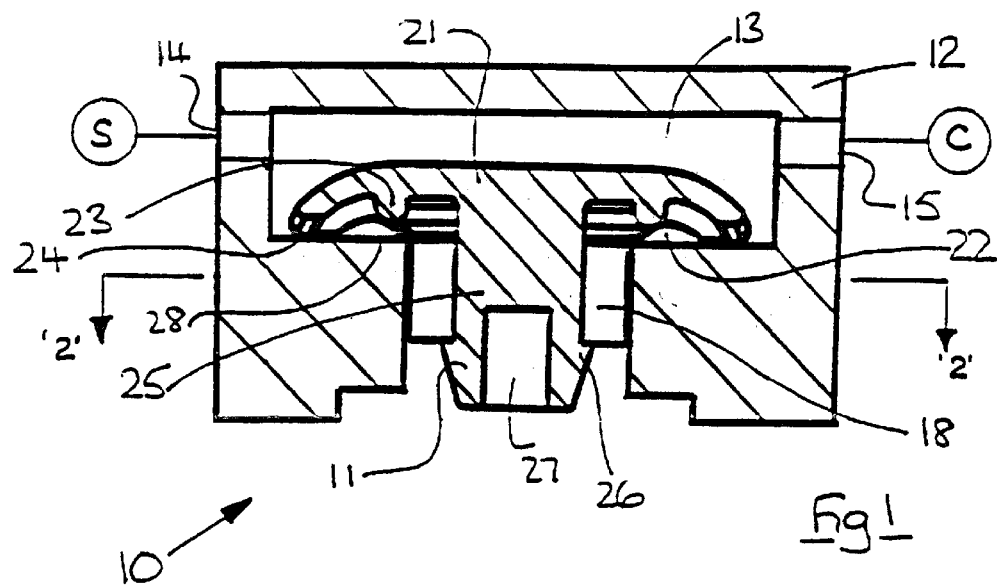
FIG. 1 is an axial section through a valve member according to the invention.
Figure 2:
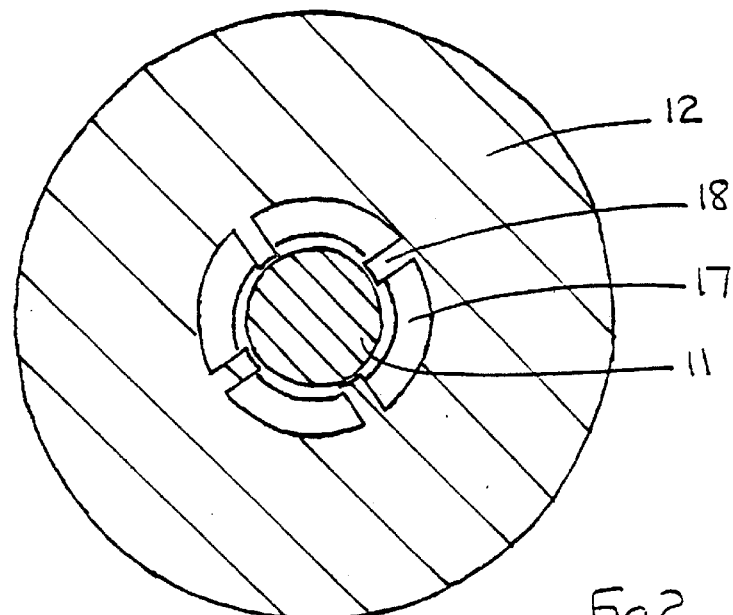
FIG. 2 is a transverse section on line 2—2 of FIG. 1.

With reference to the drawings, there is illustrated a vent valve 10 comprising an elastomeric valve member 11 situated in a schematic housing 12 having a chamber 13 with an inlet 14 from a source S and an outlet 15 to a consumer C. The chamber also has a plurality of vent passages 17 communicating to the exterior of the housing and defined by a plurality of equispaced inwardly directed arms 18.

Figure 3:
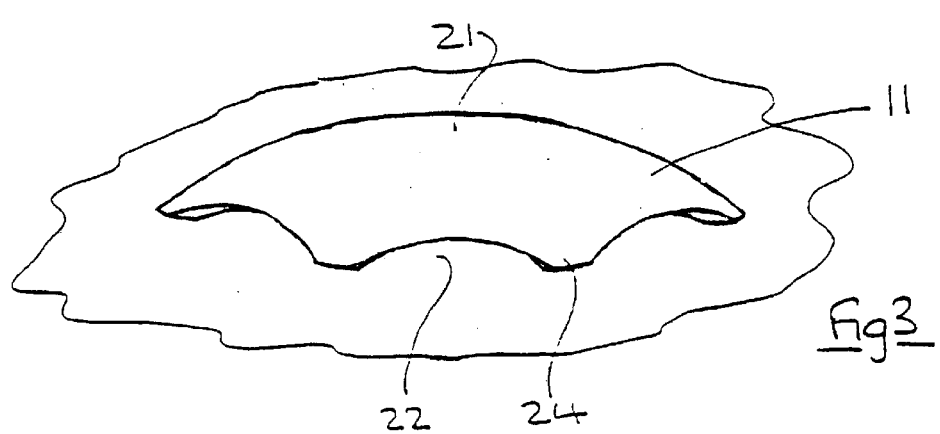
FIG. 3 is an isometric view of the valve member of FIG. 1 from above and to one side.

The elastomeric valve member 11 is of resilient material having a stiffness appropriate for the purpose, as will be further explained below. It comprises a circular dome-like head 21 having a plurality of equispaced peripheral passages 22 in order to permit communication from the exterior of the dome to the interior, and vice versa. A continuous coaxial depending rib 23 is provided on the underside of the dome. The regions between each passage 22 constitute supporting legs 24, and the whole, as shown in FIG. 3, has the appearance of the Millennium Dome. In the rest position, the legs 24 depend to a greater extent than the rib 23.

The valve member 11 has a depending coaxial limb 25 within the rib 23 which projects beyond the legs 24. The terminal end of the limb 25 has a radially outwardly extending shoulder 26 which in use engages the underside of the arms 18, as illustrated, so as to retain the valve member 11 in the housing 12. The terminal end of the limb 25 has an internal blind recess 27 in the centre to permit flexibility of the shoulder 26, for installation purposes.

In the rest condition, illustrated in FIG. 1, the axial length of the arms 18 is determined such that the valve member is installed under slight tension with the shoulder 26 and legs 24 firmly engaged with the housing 12. The rib 23 is spaced above the housing 12, as shown, so as to define a fluid passageway from the chamber 13 to the exterior of the valve housing 12 via the passages 22,17.

Although not illustrated, the housing 12 would be manufactured in such a way that the valve member can be pressed past the arms 18 from above.

Operation of the vent valve is as follows. As noted above the chamber 13 is vented to the exterior when the valve member 11 is in the rest condition.

If fluid under pressure is supplied from the source S, pressure in chamber 13 will increase. At first the passages 22,17 will permit chamber pressure to vent, but as pressure continues to increase the force acting on head 21 will increase whilst at the same time the flow through passages 22,17 will be restricted. Finally the head 21 will deform downwardly (as viewed) under pressure, bringing the rib 23 into contact with a seat 28 of the housing 12, and closing the vent. The valve member will remain in the seated condition until the pressure in chamber 13 has fallen to an extent sufficient to allow the inherent resilience of legs 24 to force the head 21 upwards, thus re-opening the vent via passages 17.

The closing and opening pressures of the valve 10 are dependent on a number of factors, including the stiffness of the valve material, the size of the vent passages 22,17, and the rate of pressure increase in the chamber 13. The skilled man will make adjustments in order to obtain a valve which will meet the desired performance criteria.

The depending rib 23 has the particular advantage of limiting the stroke of the head 21, in addition to providing a sealing surface. The rib 23 may also define the minimum flow area through the valve, if desired.

The vent valve described herein will close a short time after a compressor, as source S, has been brought off-load by a rise in pressure in a signal line from the usual governor valve. If placed low down in a signal line, the chamber 13 will act as a sump for moisture, and the valve member 11 will permit such moisture to be dynamically blown to the exterior as the valve moves from the open to the closed condition. Likewise, oil laden air or moisture from an idling compressor can be vented by a similar valve as the compressor is brought on-load, thus preventing such air reaching the consumer, and in particular a desiccant filled air dryer of a braking system.

The valve 10 has been described with an inlet port 14 and an outlet port 15. However the valve will work equally well if an inlet port only is provided, connection from the source to the consumer being established outside the chamber 13.

The valve member 11 may be retained in any convenient manner, and incorporated in any fluid device having a vent opening.

What is claimed is:

1. A vent valve for a fluid pressure circuit, the valve comprising a closed chamber having an inlet port and a vent, the vent defining a valve seat about the inner side thereof and having a resilient valve member engageable with said seat, the valve member comprising a head, a continuous rib depending from said head and adapted for sealing engagement with said seat, and means to hold said valve member adjacent said vent; the rim of said head engaging said chamber about said seat to resiliently support said rib away from said seat, and defining openings whereby said chamber can communicate with said vent; the vent valve thereby defining a fluid passage from said chamber via said openings seat and vent, and said fluid passage having a restricted flow area such that increasing pressure in said chamber deforms said head towards said vent, thereby sealingly engaging said rib and seat.

2. A vent valve according to claim 1 and further comprising retaining means to secure the valve member in relation to the vent.

3. A vent valve according to claim 2 wherein said retaining means are provided on the valve member.

4. A vent valve according to claim 3 wherein said retaining means comprises a snap fit projection of the valve member.

5. A vent valve according to claim 4 wherein said retaining means comprises a limb removably engageable in said vent.

6. A vent valve according to claim 1 wherein said valve seat and depending rib are circular.

7. A vent valve according to claim 1 wherein said seat is planar.

8. A vent valve according to claim 1 wherein said vent includes a passage having inwardly directed arms defining vent passageways therebetween.

9. A vent valve according to claim 1 wherein said vent comprises an annular insert of said chamber.

10. A vent valve according to claim 1 wherein said depending rib and valve seat co-operate to define a travel stop for limiting resilient deformation of said valve member.

11. A vent valve according to claim 6 wherein said depending rib and valve seat cooperate to define a travel stop for limiting resilient deformation of said valve member.

* * * * *